(12) United States Patent
Pillai

(10) Patent No.: US 8,106,813 B2
(45) Date of Patent: Jan. 31, 2012

(54) MULTICHANNEL CONSTANT ENVELOPE ORTHOGONAL WAVEFORMS USING RECEIVER DESIGN

(76) Inventor: Unnikrishna Sreedharan Pillai, Harrington Park, NJ (US)

( * ) Notice: Subject to any disclaimer, the term of this patent is extended or adjusted under 35 U.S.C. 154(b) by 260 days.

(21) Appl. No.: 12/694,310

(22) Filed: Jan. 27, 2010

(65) Prior Publication Data

US 2011/0183625 A1    Jul. 28, 2011

(51) Int. Cl.
*G01S 13/00* (2006.01)
*H04B 17/00* (2006.01)
(52) U.S. Cl. ........ 342/89; 342/159; 342/195; 455/67.11
(58) Field of Classification Search .............. 342/89, 342/91, 95, 159, 195; 455/67.11
See application file for complete search history.

(56) References Cited

U.S. PATENT DOCUMENTS

| | | | | |
|---|---|---|---|---|
| 4,833,696 A | * | 5/1989 | Ichiyoshi | 375/377 |
| 4,943,942 A | * | 7/1990 | Dunnion | 375/222 |
| 4,965,732 A | * | 10/1990 | Roy et al. | 342/147 |
| 5,774,795 A | * | 6/1998 | Ando | 455/106 |
| 5,867,123 A | * | 2/1999 | Geyh et al. | 342/372 |
| 5,920,285 A | * | 7/1999 | Benjamin | 342/368 |
| 6,169,744 B1 | * | 1/2001 | Grabelsky et al. | 370/447 |
| 6,654,590 B2 | * | 11/2003 | Boros et al. | 455/67.14 |
| 7,847,731 B2 | * | 12/2010 | Wiesbeck et al. | 342/360 |
| 2008/0169971 A1 | * | 7/2008 | Pillai | 342/159 |
| 2010/0164806 A1 | * | 7/2010 | Pillai | 342/385 |
| 2011/0075745 A1 | * | 3/2011 | Kleider et al. | 375/260 |
| 2011/0183625 A1 | * | 7/2011 | Pillai | 455/67.11 |

* cited by examiner

*Primary Examiner* — John Sotomayor
(74) *Attorney, Agent, or Firm* — Walter J. Tencza, Jr.

(57) ABSTRACT

An radar apparatus including a first transmitter, a second transmitter, a first receiver, a second receiver, and a control device. The control device is programmed to use both the characteristics of a first transmit signal from the first transmitter and a second transmit signal from the second transmitter to determine a first control signal for applying to the first receiver to determine its impulse response characteristics, and to determine a second control signal for applying to the second receiver to determine its impulse response characteristics which differ from the first receiver. These control signals have the ability to separate out the first transmit signal and the second transmit signal from their combined sum that appears at the input of the receiver. The procedure can be generalized to include any number of transmit signals and a corresponding number of control signals to separate out the transmit signals from their combined form.

4 Claims, 5 Drawing Sheets

MULTICHANNEL CONSTANT ENVELOPE ORTHOGONAL WAVEFORMS USING RECEIVER DESIGN

STATEMENT REGARDING FEDERALLY SPONSORED RESEARCH OR DEVELOPMENT

The present invention, in one or more embodiments is based upon work supported and/or sponsored by the Air Force Research Laboratory (AFRL) Sensors Directorate, Radar Signal Processing Branch, under an SBIR Contract No. FA8650-09-C-1628.

FIELD OF THE INVENTION

This invention relates to improved methods and apparatus concerning radar systems.

BACKGROUND OF THE INVENTION

In a two transmitter prior art radar apparatus example, first and second transmit signals are known by a control device, which can apply control signals to change the characteristics of, in one example, two receivers. The first and second transmit signals, or characteristics thereof, may be stored in a computer memory or memories. The control device of this example prior art radar apparatus time reverses the known first and second transmit signals and thereby generates corresponding first and second matched filter signals, which are used as first and second control signals, by the first and second receivers, respectively.

In this prior art radar apparatus, the first matched filter signal, which is based on the known first transmit signal but not on the known second transmit signal, is used as the first control signal to determine an impulse response or characteristic of a first receiver. The second matched filter signal, which is based on the known second transmit signal but not on the known first transmit signal, is used as a control signal to determine an impulse response or characteristic of a second receiver. In this example prior art apparatus, the first control signal (also called the first matched filter signal) separates out a first transmit signal component from a first return signal, received through the airwaves, received at an input of the first receiver. Similarly, the second control signal (also called the second matched filter signal) separates out a second transmit signal component from a second return signal, received through the airwaves, received at an input of the second receiver.

In the this simplified prior art example, the first return signal received through the airwaves, at the input of the first receiver, is filtered or acted on by the first receiver (as controlled by the first control signal) and the first receiver thereby modifies the first return signal received at its input to produce an output signal at the output of the first receiver. Similarly, the second return signal received through the airwaves, at the input of the second receiver, is filtered or acted on by the second receiver (as controlled by the second control signal) and the second receiver thereby modifies the second return signal received at its input to produce an output signal at the output of the second receiver.

In this prior art example, this is not the end of the process. Rather a typically multiple iterative process is executed in order to find appropriate first and second transmit signals. Based on an iterative back-projection algorithm between the time and frequency domain, the first transmit signal, to be transmitted through the airwaves by the first transmitter is iteratively modified to a different transmit signal, and consequently the known first transmit signal at the control device will also change. This process will be repeated until the output signal at the output of the receiver satisfies some criteria with respect to the stored known first transmit signal.

Similarly, the second transmit signal, to be transmitted through the airwaves by the second transmitter is changed to a different transmit signal, and consequently the known second transmit signal at the control device will also change. This process will be repeated until the output signal at the output of the receiver satisfies some criteria with respect to the stored known second transmit signal.

This iterative process of the example prior art radar apparatus is inefficient and has what other disadvantages. Various transmit signals, for transmitting through the airwaves, have been used or have been suggested to be used in radar systems. For example, in a series of papers, Stoica et. al. has suggested using unimodular sequences with good auto/cross correlation properties, for use as transmit signals in radar systems [P. Stoica, J. Li and X. Zhu, "Waveform Synthesis for Diversity-Based Transmit Beampattern Design," IEEE Transactions on Signal Processing, Val. 56, Issue 6, June 2008; P. Stoica, H. He, and J. Li, "New Algorithms for Designing Unimodular Sequences With Good Correlation Properties," IEEE Transactions on Signal Processing, Val. 57, No. 4, April 2009; H. He, P. Stoica, J. Li, "Unimodular Sequence Sets with Good Correlations for MIMO Radar", 2009 IEEE Radar Conference, Pasadena, Calif. USA, May 4-8, 2009

SUMMARY OF THE INVENTION

In at least one embodiment of the present invention an apparatus is provided comprising a first transmitter having a computer processor and a first transmission output, a second transmitter having a computer processor and a second transmission output, a first receiver having an input port, an output port, a control input, and a computer processor, a second receiver having an input port, an output port, a control input, and a computer processor; and a control device having computer memory and a computer processor.

In at least one embodiment, the computer processor of the first transmitter is programmed to cause the first transmitter to transmit a first transmit signal through the airwaves from the first transmission output, and the computer processor of the second transmitter is programmed to cause the second transmitter to transmit a second transmit signal through the airwaves from the second transmission output.

The first transmit signal may have a finite duration waveform and constant modulus in the time domain. The second transmit signal may have a finite duration waveform and constant modulus in the time domain. The first transmit signal may differs from the second transmit signal. The first transmission output is typically spaced apart from the second transmission output. The characteristics of the first transmit signal and the second transmit signal are typically stored in computer memory of the control device.

The computer processor of the control device is programmed to use both the characteristics of the first transmit signal and the second transmit signal to determine a first control signal. The computer processor of the control device is programmed to use both the characteristics of the first transmit signal and the second transmit signal to determine a second control signal;

The computer processor of the control device is programmed to cause the first and second control signals to be supplied to the first receiver and the second receiver, respectively;

The computer processor of the first receiver uses the first control signal to define an impulse response of the first receiver and to cause a first return signal received at an input port of the first receiver to be filtered and thereby modified into a first output signal at an output port of the first receiver. The first return signal has a component due to the first transmit signal transmitted through the airwaves and a component due to the second transmit signal transmitted through the airwaves, and the first receiver uses the first control signal to filter the first return signal into the first output signal, so that the first output signal contains a substantial part of the component due to the first transmit signal transmitted through the airwaves, and does not contain a substantial part of the component due to the second transmit signal transmitted through the airwaves;

The computer processor of the second receiver uses the second control signal to define an impulse response of the second receiver and to cause a second return signal received at an input port of the second receiver to be filtered and thereby modified into a second output signal at an output port of the second receiver. The second return signal has a component due to the first transmit signal transmitted through the airwaves and a component due to the second transmit signal transmitted through the airwaves, and the second receiver uses the second control signal to filter the second return signal into the second output signal, so that the second output signal contains a substantial part of the component due to the second transmit signal transmitted through the airwaves, and does not contain a substantial part of the component due to the first transmit signal transmitted through the airwaves.

CAN (cyclic-algorithm new) and WeCAN (Weighted CAN) can be used in one or more embodiments of the present invention for designing such transmit signal sequences with good auto-cross correlation properties. In one or more embodiments of the present invention, the equivalence of the CAN algorithms and the classic Gerchberg-Saxton (GS) algorithm involving the sequential magnitude substitution operations in the time and frequency domain for transmit signals in radar systems is demonstrated.

The present invention in one or more embodiments provides a plurality of transmit signals each of which is a unimodular sequence, which is a constant envelope or equivalently, constant modulus in the time-domain such that their respective matched filter outputs ideally resemble delta functions and the cross-matched filter outputs are zeros. Since the matched filter output represent auto and cross-correlations of the original sequences or known transmit signals, The present invention in one or more embodiments provides constant modulus time-series for transmit signals. These transmit signals have auto correlations which approximate the delta function, and the cross correlations approximate the all-zero function.

DETAILED DESCRIPTION OF THE DRAWINGS

Generally, in a simplified radar system, a transmitter outputs a transmit signal which travels through the air waves until it interacts with a target. The transmit signal is modified by its interaction with the target and is further modified by interaction with noise or noise signals and/or interference or interference signals. The interaction with noise and/or interference may occur prior to, during, or after the interaction of the transmit signal with the target. A return signal is a signal received at a receiver input port of a receiver, from the airwaves, which is a modified version of the transmit signal after the transmit signal has been modified by interaction with one or more targets, noise, and interference, and by the delay in space and/or time from transmission of the transmit signal from the transmitter to reception of the return signal at the receiver input. The receiver may be located at substantially the same or the same geographic location as the transmitter, or at a different location.

In a more general set up of a radar system, a plurality of transmitters may output a plurality of transmit signals towards a plurality of targets. A plurality of receivers may receive a plurality of return signals. In such an example, each transmit signal, of the plurality of transmit signals, may have a different bandwidth, energy, and waveform shape.

Figure 3:
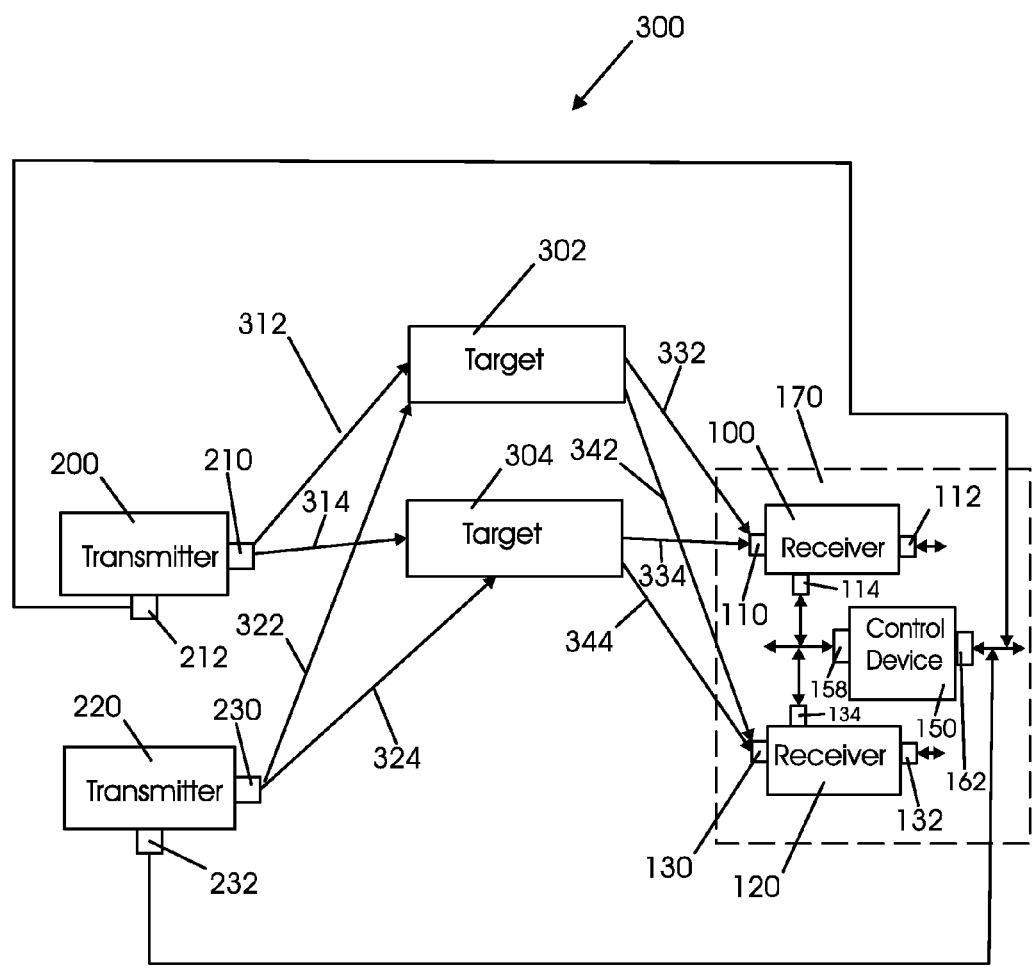
FIG. 3 shows a simplified block diagram of a radar system of a plurality of transmitters, a plurality of targets, and a receiver complex or apparatus comprised of a plurality of receivers and the control device of FIG. 1.
Figure 4:
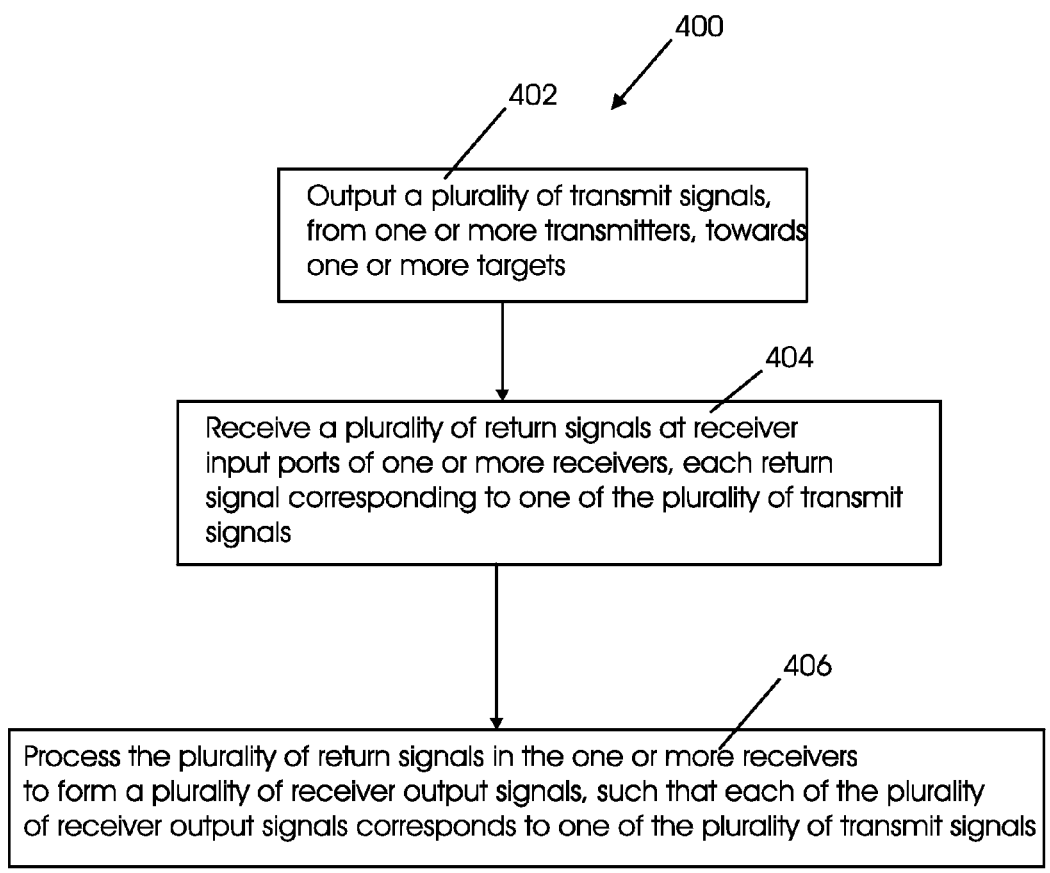
FIG. 4 is a flow chart of a method in accordance with an embodiment of the present invention.
Figure 5:
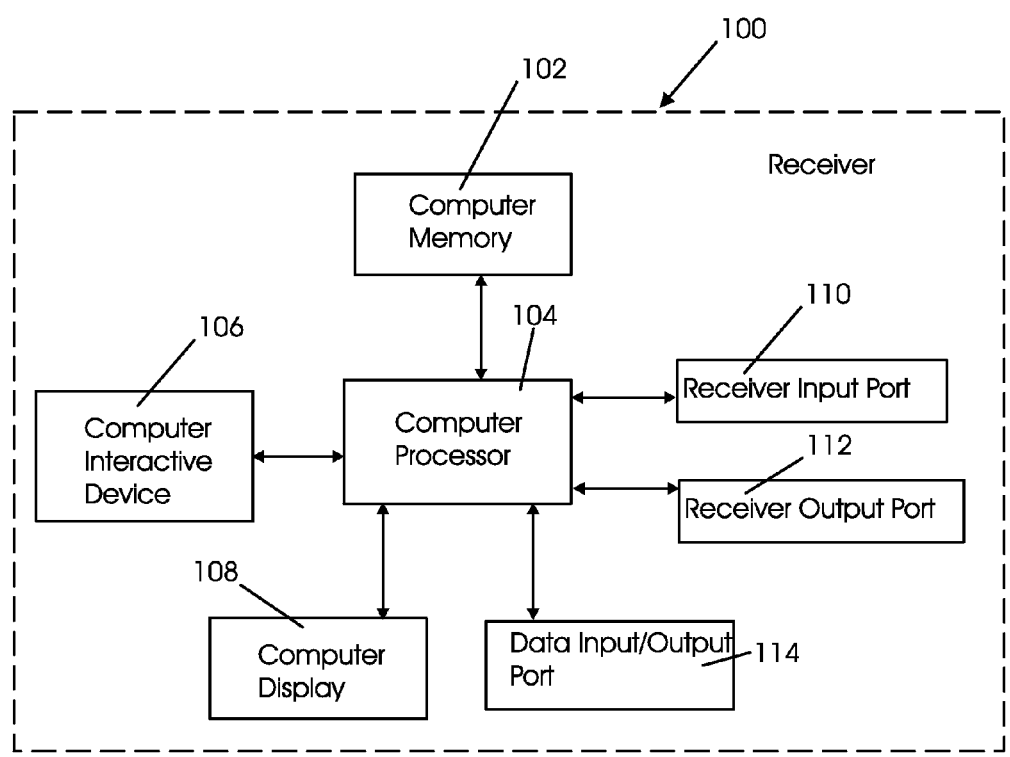
FIG. 5 shows a simplified block diagram of a receiver for use in accordance with an embodiment of the present invention.

Each of the receivers 100 and 120, such as shown in FIG. 3, may be a linear time-invariant receiver characterized by a unique impulse response waveform. The receivers 100 and 120, may have the same structure but may be programmed to have a different impulse response waveform. The structure of receiver 100 is described with reference to FIG. 5, and the structure of receiver 120 may be the same as for receiver 100. The receiver 100 may include a computer memory 102, a computer processor 104, a computer interactive device 106 (such as including a computer keyboard, touch screen or mouse), a computer display or monitor 108, a receiver input port 110, a receiver output port 112, and a data input/output port 114. The components 102, 106, 108, 110, 112, and 114 may communicate with the computer processor 104 through communications links such as hardwired, optical, wireless communications links, or any other type of communications links. The receiver 100 will be programmed by signals supplied through data input/output port 114 to computer processor 104 to have a unique impulse response waveform which will differ from the impulse response waveform of the receiver 120 and in at least one embodiment, of any other receiver in an applicable radar system or apparatus. The unique impulse response waveform is the waveform of an output signal which appears or is output at receiver output port 112 of the receiver 100 in response to an impulse signal supplied at the input 110 of the receiver 100, when the receiver 100 is programmed by control signals supplied to port 114 to have such an impulse response waveform. The impulse response waveform is thus determined, controlled, and/or varied by signals from the control device 150 which are supplied to port 114. Similarly, the receiver 120 may have an impulse response waveform which is determined, controlled, and/or varied by signals from the control device 150. The control device 150 uses the first transmit signal or representation that the control device 150 receives from the transmitter 200 via ports 212 and 162, and the second transmit signal or representation the control device 150 receives from the transmitter 220 via ports 232 and 162 to determine first and second control signals. Both the first and the second transmit signals, or representations, are needed to determine the first control signal. Both the first and the second transmit signals, or representations are needed to determine the second control signal. In at least one embodiment, the first control signal will become or will act as the impulse response for the first receiver 100 and the second control signal will become or will act as the impulse response for the second receiver 120.

The first control signal is sent from the control device 150 via port 158 and port 114 to the receiver 100. The first control signal is used to separate out components of signals received at input port 110 which are due to the first transmit signal transmitted through the airwaves from port 210 of transmitter 200. The second control signal is sent from the control device 150 via port 158 and port 134 to the receiver 120. The second control signal is used to separate out components of signals received at input port 130 which are due to the second transmit signal transmitted through the airwaves from port 230 of transmitter 200. The computer processor 154 of the control device 150 is programmed to determine the first and the second control signals based on data stored in the computer memory 152 and based on the first and second transmit signals or representations received at port 162 of control device 150.

The computer processor 154 of the control device 150 is programmed to send signals to the port 114 of the receiver 100 to determine the impulse response of the receiver 100, after the control device 150 receives the first transmit signal or characteristics of the first transmit signal from transmitter 200 via port 212, and port 162, and after the control device 150 receives the second transmit signal or characteristics of the second transmit signal from the transmitter 220 via port 232, and port 162. The first and second transmit signals or their representations or characteristics thereof, such as a digital or analog representation, may be stored in the computer memory 152 or may be stored in computer memory of the receivers 100 or 120.

Similarly, the computer processor 154 of the control device 150 is programmed to send signals to the port 134 of the receiver 120 to determine, control and/or vary the impulse response of the receiver 120, after the control device 150 receives the first transmit signal or characteristics of the first transmit signal from transmitter 200 via port 212, and port 162, and after the control device 150 receives the second transmit signal or characteristics of the second transmit signal from the transmitter 220 via port 232, and port 162. The first and second transmit signals or their representations or characteristics thereof, such as a digital or analog representation, may be stored in the computer memory 152 or may be stored in a computer memory of the receiver 120.

Figure 1:
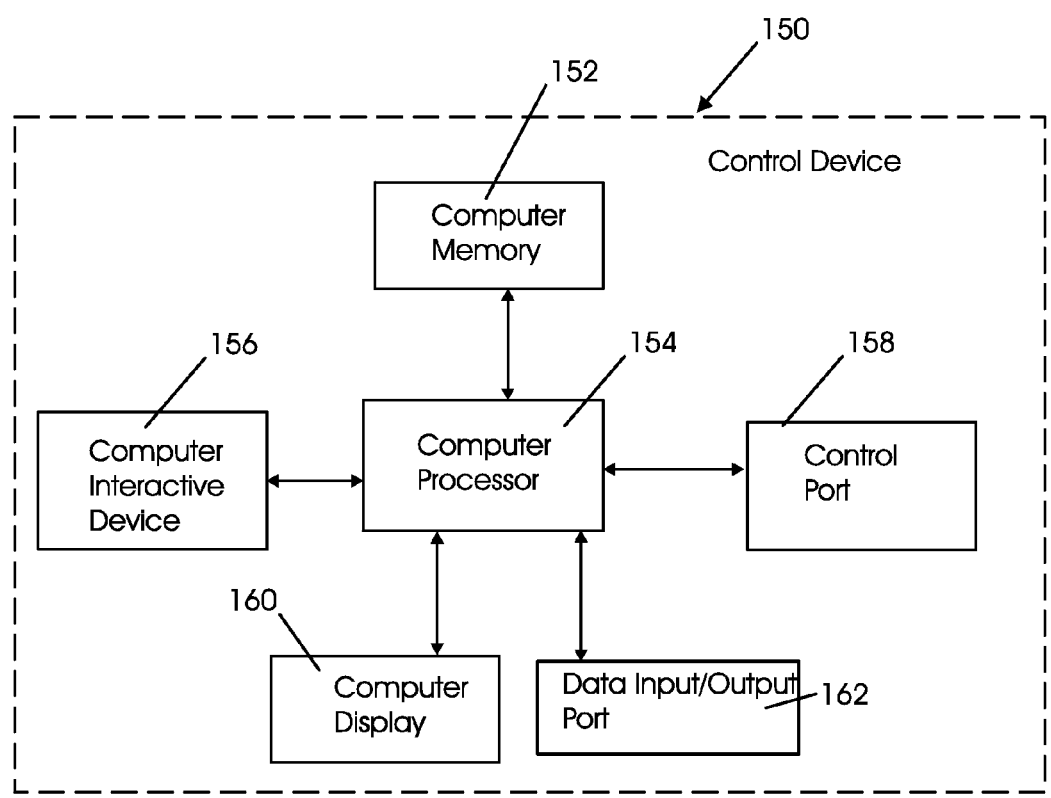
FIG. 1 shows a simplified block diagram of a control device for use in accordance with an embodiment of the present invention.
Figure 2:
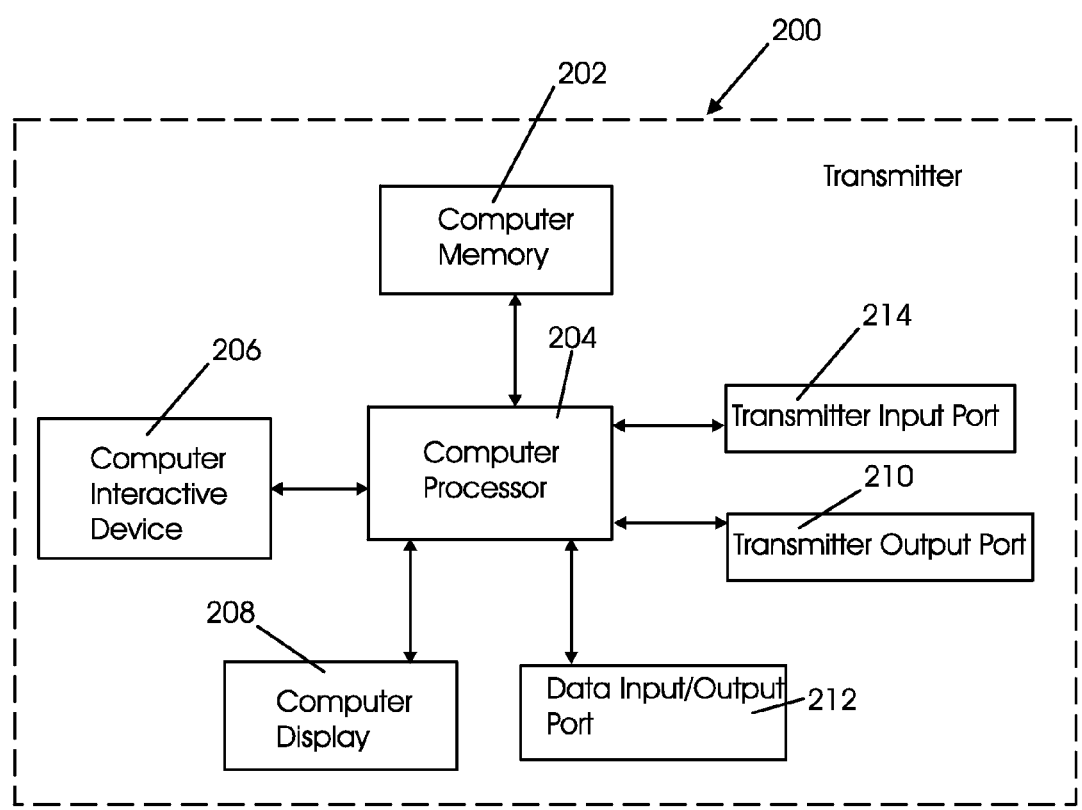
FIG. 2 shows a simplified block diagram of a transmitter for use in accordance with an embodiment of the present invention.

FIG. 3 shows a radar system and/or apparatus 300. The radar system and/or apparatus 300 includes a plurality of transmitters, including a transmitter 200 and a transmitter 220. Two transmitters, 200 and 220 are shown for ease of description and the apparatus 300 could include any further number of transmitters. The radar system and/or apparatus 300 also includes targets 302 and 304 and a receiver device or complex 170 within the dashed lines. The receiver device or complex 170 includes a plurality of receivers, including receivers 100 and 120, and a control device 150 for controlling the receivers 100 and 120. A block diagram of the control device 150 is shown in FIG. 1. The receivers 100 and 120 may be part of the receiver device or complex 150, such that receivers 100 and 120 are located at substantially the same or the same geographic location. Two targets, 302 and 304, and two receivers 100 and 120, are shown for ease of description and the apparatus 300 could include any further number of targets and receivers. Each of the two targets 302 and 304 may be any type of target, such as for example an airbased target such as an airplane, or a ground based target such as a military tank, or any other target moving or not moving.

The receiver device or complex 170 may include any further number of receivers, similar or identical to 100 and 120, or a plurality of receiver complexes or devices, similar or identical to device or complex 170 may be provided. If a plurality of receiver complexes or devices are provided, they may be spaced apart geographically.

Referring to FIG. 1, the control device 150 may include a computer memory 152, a computer processor 154, a computer interactive device 156, such as a computer keyboard, touch screen, or computer mouse, a control port 158, a computer display or monitor 160, and a data input/output port 162. The components 152, 156, 158, 160, and 162 may communicate with the computer processor 154 through communications links, such as electrical, optical, wireless, or any other type of communications links.

Referring to FIG. 3, the transmitters 200 and 220, and the receivers 100 and 120 may be located at different geographic locations or at the same geographic location. The transmitter 200 outputs or transmits through the airwaves, a first transmit signal having a first transmit signal bandwidth, a first transmit signal energy, and a first transmit signal waveform or waveform shape. The second transmitter 220 outputs or transmits through the airwaves, a second transmit signal having a second transmit signal bandwidth differing from the first transmit signal bandwidth, a second transmit signal energy differing from the first transmit signal energy, and a second transmit signal waveform or waveform shape differing from the first transmit signal.

The first transmit signal from the transmitter 200 is output or transmitted, such as from an output port 210, which may be include an antenna, so that the first transmit signal radiates in many directions. At least part of the first transmit signal travels in a path or direction 312 until it interacts with the target 302, forming a first target modified first transmit signal. After interacting with the target 302, the first target modified first transmit signal radiates out in many directions. At least a part of the first target modified first transmit signal travels in a path or direction 332 and is received as a return signal at an input port 110 of the receiver 100, and at least a part of the first target modified first transmit signal travels in a path or direction 342 and is received as a return signal at an input port 130 of the receiver 120.

At least part of the first transmit signal travels in a path or direction 314 until it interacts with the target 304, forming a second target modified first transmit signal. After interacting with the target 304, the second target modified first transmit signal radiates out in many directions. At least a part of the second target modified first transmit signal travels in a path or direction 334 and is received as a return signal at the input port 110 of the receiver 100, and at least a part of the second target modified first transmit signal travels in a path or direction 344 and is received as a return signal at the input port 130 of the receiver 120.

The second transmit signal from the transmitter 220 is output or transmitted through the airwaves, such as from an output port 230, which may be an antenna, so that the second transmit signal radiates in many directions. At least part of the second transmit signal travels in a path or direction 322 until it interacts with the target 302, forming a first target modified second transmit signal. After interacting with the target 302, the first target modified second transmit signal radiates out in many directions. At least a part of the first target modified second transmit signal travels in a path or direction 332 and is received as a return signal at the input port 110 of the receiver 100, and at least a part of the first target modified second transmit signal travels in a path or direction 342 and is received as a return signal at the input port 130 of the receiver 120.

At least part of the second transmit signal travels in a path or direction 324 until it interacts with the target 304, forming a second target modified second transmit signal. After interacting with the target 304, the second target modified second transmit signal radiates out in many directions. At least a part of the second target modified second transmit signal travels in a path or direction 334 and is received as a return signal at the input port 110 of the receiver 100, and at least a part of the second target modified second transmit signal travels in a path or direction 344 and is received as a return signal at the input port 130 of the receiver 120.

Although not stated explicitly in the above description of FIG. 3, return signals received at the input ports 110 and 130 of receivers 100 and 120, respectively, also would include the effects of noise signals and interference signals which may modify any of the transmit signals or modified transmit signals prior to, during, and after interaction with any of the targets, such as 302 and 304.

As can be seen from the above description of FIG. 3, receiver 100 receives at least four return signals at its input port 110: (1) a first return signal due to the first transmit signal from transmitter 200 and modified by the first target, (2) a second return signal due to the first transmit signal from the transmitter 200 and modified by the second target, (3) a third return signal due to the second transmit signal from the transmitter 220 and modified by the first target, and (4) a fourth return signal due to the second transmit signal from the transmitter 220 and modified by the second target.

Similarly, the receiver 120 receives at least four return signals at its input port 110: (1) a fifth return signal due to the first transmit signal from transmitter 200 and modified by the first target, (2) a sixth return signal due to the first transmit signal from the transmitter 200 and modified by the second target, (3) a seventh return signal due to the second transmit signal from the transmitter 220 and modified by the first target, and (4) an eighth return signal due to the second transmit signal from the transmitter 220 and modified by the second target.

Note that the first, second, third, and fourth return signals received by the receiver 100 may not be the same as the fifth, sixth, seventh, and eight signals, respectively received by the receiver 120 at least due to different effects of orientation of the targets 302 and/or 304, aspect angles etc. as well as noise signals and interference signals, and due to the fact that targets 302 and 304 may be at different geographic locations.

The receiver 100 typically receives the first, second, third, and fourth return signals together as a first aggregate signal at the receiver input port 110 shown in FIG. 3.

The receiver 120 may be identical to the receiver 100, except receiver 120 has a different impulse response waveform characteristic and also differs as hereinafter described. The receiver 120 typically receives the fifth, sixth, seventh, and eighth return signals together as a second aggregate signal at the receiver input port 130 shown in FIG. 3.

If the first receiver 100 and the second receiver 120 are located at substantially the same geographic location, the first aggregate signal and the second aggregate signal may still be substantially different because of the physical locations and orientation of the targets 302 and 304 with respect to the receivers 100 and 120 and the transmitters 200 and 220.

The transmitter 200 has a data input/output port 212 through which the first transmit signal or a digital representation of the first transmit signal can be supplied to a data input/output port 162 of the control device 150. This can be done prior to transmission of transmit signals through the airwaves from transmitters 200 and 220 from transmitters, antennas, or output ports 210 and 230. There may be a protocol by which the known transmit signals or digital characteristics of the transmit signals or updated versions of the transmit signals are sent, in some embodiments simultaneously or earlier, from the data input/output ports 212 and 232 to data input/output port 162 of the control device 150. Similarly, the transmitter 220 has a data input/output port 232 through which the second transmit signal or a digital representation of the second transmit signal can be supplied to the to the data input/output port 162 of the control device 150. The first and second transmit signals or the digital representations of those, as received on the input/output port 162 can be stored in the computer memory 152 of the control device 150 by the computer processor 154, in accordance with programming of the computer processor 154. Thus, a single computer memory, such as 152 can be used by both receivers 100 and 120 if they are part of the same receiver complex or device 170 at substantially the same, or the same geographic location. In this manner, in at least one embodiment of the present invention, the first and second transmit signals (without any modification by noise, interference, targets, time delay, or space delay) are known by the computer processor 154 of the control device 150. The computer processor 154 of the control device 150, is programmed by a computer program stored in the computer memory 152 to use the known first and second transmit signals stored in the computer memory 152 to generate first and second control signals which are supplied to the control port 158.

The first control signal generated by the computer processor 154 of the control device 150 is supplied to the port 114 of the receiver 100 and used by the computer processor 104 of the receiver 100 to form an impulse response or impulse response characteristic to separate out the first component due to the first transmit signal transmitted through the airwaves from transmitter 200 and modified by the target 302, and to separate out the second component due to the first transmit signal transmitted through the airwaves from the transmitter 200 and modified by the target 304. The computer processor 154 is programmed, by a computer program stored in the computer memory 152, to analyze the first aggregate signal, to store the first aggregate signal in the computer memory 152, and to separate the first aggregate signal into a first component due to the first transmit signal from the transmitter 200 as modified by the first target 302 and a second component due to the first transmit signal from the transmitter 200 as modified by the second target 304. The computer processor 154 may be programmed to store the first component due to the first transmit signal and modified by the first target 302 and the second component due to the first transmit signal and modified by the second target 304 in the computer memory 152 or to display the first and the second components on the computer display 160. After the first and the second components are separated out from the first aggregate signal, the first and the second components may be analyzed or combined by the computer processor 154 along with analogous components from other receiver complexes or devices, not shown, similar to or identical to the receiver complex or device 170. An analogous component at another receiver complex or device, not shown, would be a component due to the same transmit signal and modified by the same target. As a result, the receiver 100 produces the first component and the second component at its output port 112.

The second control signal generated by the computer processor 154 of the control device 150 is supplied by the computer processor 154 to the port 158 and then to the port 134 of the receiver 120 and is used by the receiver 120 to separate out the third component due to the second transmit signal transmitted through the airwaves from transmitter 220 and modified by the target 302, and to separate out the fourth component due to the second transmit signal transmitted through the airwaves from the transmitter 220 and modified by the second target 304. As a result the receiver 120 produces the third component and the fourth component at its output port 132. The computer processor 154 is programmed, by a computer program stored in the computer memory 152, to analyze the second aggregate signal, to store the second aggregate signal in the computer memory 152, and to separate the second aggregate signal into a third component due to the second transmit signal from the transmitter 200 and modified by the first target 302 and a fourth component due to the second transmit signal from the transmitter 200 and modified by the second target 304. The computer processor 154 may be programmed to store the third component due to the second transmit signal and modified by the first target 302 and the fourth component due to the second transmit signal and modified by the second target 304 in the computer memory 152 or to display the third and the fourth components on the computer display 160. After the third and the fourth components are separated out from the second aggregate signal, the third and the fourth components may be analyzed or combined by the computer processor 154 along with analagous components from other receiver complexes or devices, not shown, similar to or identical to the receiver complex or device 170. An analogous component at another receiver complex or device, not shown, would be a component due to the same transmit signal and modified by the same target.

In at least one embodiment of the present invention, contrary to the prior art, any first and second transmit signals may be transmitted through the airwaves by the first transmitter 200 and the second transmitter 220, respectively. The first and second transmit signals actually transmitted through the airwaves do not have to be changed, and in one embodiment are not changed. There is no need for a time consuming and complicated iterative process of changing the transmit signals actually transmitted through the airwaves and checking the output at the receiver output ports, as in the prior art.

In addition, in at least one embodiment of the present invention, the first and second transmit signals, transmitted through the airwaves from the first transmitter 200 and the second transmitter 220, respectively, may be any type of transmit signals, but preferably each of the transmit signals should have both a constant envelope property, which in this application will also be referred to as a "unimodular sequence" or a "unimodular signal", to optimize the transmitter output amplifier efficiency Each transmit signal transmitted through the airwaves (and therefore each known transmit signal known to the control device 150 may be defined by the following equation:

$$x_i(n), n=1, 2, \ldots N, i=1, 2, \ldots M. \tag{47}$$

Such that $x_i(n)$, n=1, 2, ... N is the first transmit signal transmitted through the airwaves by the transmitter 200. This first transmit signal is also known to the control device 150, such as by being supplied via ports 212 and 162 from the transmitter 200 directly to the control device 150.

The signal $x_2(n)$, n=1, 2, ... N is the second transmit signal transmitted through the airwaves by the transmitter 220. The second transmit signal is also known to the control device 150, such as by being supplied via ports 232 and 162 from the transmitter 220 directly to the control device 150.

A signal $x_3(n)$, n=1, 2, ... N would be a third transmit signal transmitted through the airwaves by a third transmitter, not shown, and there may be any further number of transmitters transmitting any further number of corresponding transmit signals.

The variable n represents the current time index, and the variable N represents the total number of time samples present in each transmit signal. The number of transmit signals and corresponding transmit waveforms (and generally the number of transmitters) is referred to as a variable M. In the diagram of FIG. 3, M would be 2.

Generally, in at least one embodiment of the present invention, each of the first and the second transmit signals or any further number of transmit signals transmitted through the airwaves from the transmitters 200 and 220 or any further number of transmitters, can be any signal as long as each transmit signal has a constant modulus. Constant modulus means that the absolute value of each transmit signal or of each transmit signal waveform at any instant is constant.

The control device 150 uses all of the known transmit signals ($x_i(n)$, n=1, 2, ... N), stored in the computer memory 152 and/or previously received from the transmitter 200 via ports 212 and 162 and from the transmitter 220 via ports 232 and 162 and any further number of transmitters used, not shown, to determine first, second, and any further number of control signals. There will be a control signal for each transmit signal, i.e. for each transmitter. In the example of two transmitters 200 and 220, the first and second control signals in accordance with an embodiment of the present invention are determined by the following equations which are programmed into the computer memory 152 and/or the computer processor 154 of the control device 150. The computer processor 154 of the control device 150 is programmed by computer software to retrieve $x_i(n)$, n=1, 2, ... N from computer memory 152 and to calculate a first control signal $h_1(n)$, n=1, 2, ... N and a second control signal $h_2(n)$, n=1, 2, ... N (and any further number of control signals not shown) by the equation:

$$\underline{h}_i = A_i^{-1} \underline{b}^*_{n_o}, n=1, 2, \ldots N \tag{48}$$

Wherein $h_1(n)$, n=1, 2, ... N is the first control signal time samples or first impulse response supplied to the port 114 of the receiver 100 in FIG. 3; and wherein $h_2(n)$, n=1, 2, ... N is the second control signal or second impulse response supplied to the input 134 of the receiver 120.

In the equation (48) $A_i^{-1}$ is the inverse of the matrix $A_i$ defined by:

$$A_i = F^*_{i,o} F_{i,o} + \Sigma F^*_j F_j > 0 \tag{49}$$

Here $A_i$ represents a K×K positive-definite matrix, and $F_i$ represents the (N+K−1)×K matrix $$F_i = \begin{pmatrix} x_i(1) & 0 & \ldots & 0 & 0 \\ x_i(2) & x_i(1) & \ddots & \vdots & 0 \\ \vdots & x_i(2) & \ddots & 0 & \vdots \\ x_i(N) & \vdots & \ddots & x_i(1) & 0 \\ 0 & x_i(N) & \ddots & \vdots & x_i(1) \\ 0 & 0 & \ddots & x_i(N-1) & \vdots \\ \vdots & \vdots & \vdots & x_i(N) & x_i(N-1) \\ 0 & 0 & 0 & 0 & x_i(N) \end{pmatrix} \tag{50}$$

generated from the $i^{th}$ input sequence, for the ith transmit signal from the ith transmitter $\underline{x}_i$. In equation (49), $F_{i,0}$ represents the $(N+K-2)\times K$ matrix generated from $F_i$ with its $n_o$ row deleted. Finally in the equation (48), $\underline{b}_{n_o}$ represents the row vector corresponding to the $n_o$ th row of $F_i$. Thus in general $$b_{n_o} = [0, \ldots 0, x_i(N), x_i(N-1), \ldots x_i(1), 0, \ldots 0] \quad (51)$$

for $n_o > N$. Note that the number of zeros in the equation (51) depends on the value of $n_o$ with respect to M. For example, with $n_o = N$ and $K = N$, the vector $\underline{b}_{n_o}$ is the same as the flipped version of $\underline{x}_i$ as in (35).

One or more embodiments of the present invention uses a plurality of unimodular sequences for a corresponding plurality of transmit signals from a corresponding plurality of transmitters, such as transmitters 200 and 220 in FIG. 3. A computer processor 154 and/or computer memory 152 of a control device 150 is programmed to supply control signals to separate out components due to transmit signals from returns signals that come back from one or more targets. In at least one embodiment, the control signals are typically not matched sequences matching to the characteristics of the transmit signals.

The computer processor 154 and/or the computer memory 152 of the control device 150 are programmed to determine control signals (impulse responses) for the receivers 100 and 120 which satisfy requirements or criteria for the output at output port 112 of the receiver 100 and for the output at output port 132 of the receiver 120. At least one embodiment of the present invention provides the freedom to provide any transmit signal or signals (typically constant envelope). The equations for determining the control signals programmed into the control device 150 greatly minimize the side-lobe levels of the signals provided at the output ports 112 and 132 of the receivers 100 and 120, respectively. This is realized by using a criterion similar to the merit factor (MF) in equation (21) to be described hereinafter. Thus if we define $$\eta_i = \frac{|z_{ii}(n_o)|^2}{\sum_{n\neq n_o} |z_{ii}(n)|^2 + \sum_{j\neq i}\sum_{n=1}^{N+K-1} |z_{ij}(n)|^2}, \quad (52)$$

$$i = 1 \to M$$

to represent the ratio of the receiver output peak value power to the total undesired sidelobe power at each receiver output, such as each of receiver outputs 112 and 132, then the receiver design problem is to maximize $\eta_i$, $i=1 \to M$. Here $$z_{i,m}(n) = \sum_{k=1}^{N} x_i(k) h_m(n-k+1), \quad (53)$$

$$n = 1 \to N + K - 1$$

representing the output at the $m^{th}$ receiver due to the $i^{th}$ sequence at time instant n, then ideally, we require $$z_{i,m}(n) = \begin{cases} \delta_{i,m}(n - n_o), & i = m \\ 0, & i \neq m \end{cases} \quad (54)$$

where $n_o$ corresponds to the desired peak term at the output. Notice that in general, the receiver length K is a free parameter left to other design considerations.

Recent advances in designing unimodular sequences for transmit signals with good auto/cross correlation properties are reviewed here along with a new approach of an embodiment of the present invention involving providing control signals from the control device 150 to one or more receivers, such as 100 and 120.

In at least one embodiment of the present invention, each transmit signal is a unimodular sequence. The control device 150 is programmed to provide first and second control signals to the two receivers 100 and 120, respectively, in the two transmitter—two receiver embodiment of FIG. 3. The control signals are based on the known transmit signals, but the known transmit signals can be of any form as long as each transmit signal has constant envelope. Thus the control signals (impulse responses) for the receivers 100 and 120 (and one can say therefore the design of the receivers 100 and 120 which is determined by the impulse responses) depend on the transmit signals but are not matched to the transmit signals This approach is useful in many applications including radar, where the control device 150 does not have to provide control signals to the receivers 100 and 120 to cause each to be unimodular and can cause each of the receivers 100 and 120 to have an impulse response something other than a matched filter sequence, which is matched to a particular transmit signal. In this context, the problem is to design M unimodular sequences $\underline{x}_i$, $i=1\to M$, $|x_{i,j}|=1$ each of length N as in equation (33), for the transmit signals, and the impulse responses (control signals to be output by control device 150 and supplied to one or more receivers, such as receiver 100 and 120) for their corresponding receivers $$\underline{h}_i = [h_{i,1}, h_{i,2}, \ldots h_{i,K}], i=1 \to M \quad (55)$$

such that the receiver outputs (such as signals at the outputs 112 and 132 from the receivers 100 and 120 shown in FIG. 3) are as given in equations (48)-(51).

One approach in this context is to use a criterion similar to the merit factor (MF) in equation (21). Thus if we define $\eta_i$, $i=1\to M$ as in (52) to represent the ratio of the receiver output peak value power to the total undesired sidelobe power at each receiver output, then the receiver design problem is to maximize $\eta_i$, $i=1\to M$. Observe that the criterion in equation (52) is well known and it is the same as the approach behind the classical matched filter. Eq. (52) can be expressed in matrix form as $$\eta_i = \frac{|b_{n_o} h_i|^2}{\underline{h}_i^* A_i \underline{h}_i}, \quad (56)$$

$$i = 1 \to M$$

where $A_i$ represents a $K\times K$ positive-definite matrix as in Eq. (49), and $F_i$ represents the $(N+K-1)\times K$ matrix as in (50). Observe that the impulse responses or control signals $\underline{h}_i$ in (48), supplied by the control device 150 for the receivers, such as the receivers 100 and 120, are obtained non-iteratively and the freedom present at the transmitters regarding the type of known transmit signals which can be provided at the port 162 of the control device 150 to be used to determine the control signals (or impulse responses) to be supplied to the receiver ports 114 and 134 makes the unimodular constraint trivial to implement at the transmitter ports 210 and 230. Although each receiver design (or determination of the control signal or impulse response for each receiver) depends on all transmit signal input sequences (i.e. depends on all transmit signals) through the matrix $A_i$ in the equation (49), nevertheless the control signals (or impulse response) can be determined in an uncoupled manner, meaning each control signal can be determined separately from other control signals using equation (48) and (55). Furthermore, the explicit design for each of the control signals (or impulse responses) of each of the receivers 100 and 120 and any further number of receivers, allows freedom in deciding the output instant $n_o$ at which the peak of an output signal should be observed, at the output ports 112 and 132 of the receivers 100 and 120, respectively. This freedom allows the various peak outputs, at ports 112 and 132, to be time aligned, a desired property in some radar applications.

In one or more embodiments of the present invention recent advances in designing unimodular sequences for transmit signals with good auto/cross correlation properties along with an approach that emphasizes an independent receiver design (through control signals or impulse responses) to minimize sidelobes of output of receivers. Since the matched filter outputs represent auto and cross-correlations of the original transmit signal sequences, the problem solved by one or more embodiments of the present invention is to design constant modulus time-series transmit signals whose receiver outputs approximate the delta function, and the cross correlations approximate the all-zero function. In this context, CAN (cyclic-algorithm new) and WeCAN (Weighted CAN) have been proposed previously for designing such transmit signal sequences with good auto-cross correlation properties. The equivalence of the CAN/WeCAN algorithms and the classic Gerchberg-Saxton (GS) algorithm involving the sequential magnitude substitution operations in the time and frequency domain is demonstrated here, with an interesting generalization of the GS algorithm to the multichannel case.

The design of unimodular sequences for transmit signals in a radar system is further generalized here by considering the receiver design (I.e. design of control signals or impulse responses) to be independent from the actual known transmit signal sequences. The receiver design takes care of the desired sidelobe requirements and the freedom present at the input 162 of a control device 150, in terms the known transmit signal sequences provided can be used to further minimize the output sidelobe levels of the output at receiver output ports 112 and 132 of receivers 100 and 120, respectively.

The form of the first and second transmit signals (and any further number of transmit signals) for use with at least one or more embodiments of the present invention has been derived by the inventor of the present invention as follows.

Firstly, using the known Gerchberg-Saxton algorithm, which considers the problem of reconstructing a time function or signal with known partial magnitude information both in the time and frequency domain, let $$f(t)=a(t)e^{j\theta(t)} \leftrightarrow F(\omega)=A(\omega)e^{j\psi(\omega)} \quad (1)$$

represent a Fourier transform pair. Given the partial information $$a(t) \geq 0, \ 0 < t < T, \text{ and } A(\omega) \geq 0, \ |\omega| < B_o, \quad (2)$$

both in time and frequency domains, the problem is to reconstruct an entire transmit signal f(t) in some optimal fashion. It is well known that the set of all signals that have a prescribed value in the interval (0, T) as in (2) forms a closed convex set C. Convex sets have the remarkable property that for any point f(t) outside C, there exists a unique nearest neighbor Pf(t) such that $$\|f(t)-Pf(t)\| \leq \|f(t)-g(t)\|, \text{ for all } g(t) \in C. \quad (3)$$

Although the set of all signals $C_M$ with the given magnitude transform $M(\omega)$ do not form a closed convex set, nevertheless, it is possible to assign to every arbitrary transmit signal f(t) that is outside this set a "nearest neighbor" signal $P_M f(t)$ that belongs to $C_M$ such that there exists no other signal $g(t) \in C$ for which $$\|f(t)-g(t)\| < \|f(t)-P_M f(t)\| \quad (4)$$

is satisfied. [D. C. Youla, "Mathematical Theory of image Restoration by the Method of Convex projections," Chapter 2, Theorem 2.4-1, in Image Recovery: Theory and Application edited by H. Stark, pages 29-77, Academic press, Inc., New York.]. In the case of closed convex sets the above operator is the projection operator and the "nearest neighbor" is unique. In the case of the above magnitude substitution operator, the uniqueness property is not preserved for the "nearest neighbor" and in general only the inequality constraint $$\|f(t)-P_M f(t)\| \leq \|f(t)-g(t)\|, \text{ for all } g(t) \in C_M \quad (5)$$

is generated. Given an arbitrary transmit signal f(t), to determine $P_M f(t)$, with the prescribed Fourier transform magnitude $M(\omega)$ we need to generate $g(t) \in C_M$ such that $\|f(t)-g(t)\|^2$ is minimum over $\Omega$. With $$f(t) \leftrightarrow F(\omega) = |F(\omega)|e^{j\psi(\omega)}, \quad (6)$$
$$g(t) \leftrightarrow G(\omega) = M(\omega)e^{j\phi(\omega)}$$

$$P_M f(t) = \begin{cases} M(\omega)e^{j\psi(\omega)}, & \omega \in \Omega \\ F(\omega), & \omega \in \Omega' \end{cases} \quad (7)$$

gives the magnitude substitution operator [A. Levi and H. Stark, "Image Restoration by the Method of Generalized Projections with Applications to Restoration from Magnitude," IEEE International Conference on Acoustics, Speech and Signal Processing, ICASSP'84, pages 88-91, March 1984]. Similarly, a constant envelope signal f(t), such as for a transmit signal in a radar system, can be expressed as $$f(t)=Ae^{j\theta(t)} \quad (8)$$

where A is a suitable positive constant that can be used to maintain a prescribed energy level for the transmit signal f(t).

It is easy to see that transmit signals with the same constant envelope level do not form a convex set; however their behavior is similar to the transmit signal set with given Fourier transform magnitude. Hence if $C_A$ denotes the set of functions {g(t)} that have constant envelope level A, although $C_A$ is not a convex set, it is possible to define an operator $P_A$ that assigns to every arbitrary function f(t) a nearest neighbor $P_A f(t)$ that belongs to $C_A$ as in Equation (5). Thus with $$f(t) = a(t)e^{j\theta(t)} \quad (9)$$

$$P_A f(t) = \begin{cases} Ae^{j\theta(t)}, & t \in T \\ f(t), & \text{otherwise} \end{cases} \quad (10)$$

where the interval (0, T) represents the temporal duration over which the constant envelope property is to be maintained. The error between $f_k(t)$ and its constant envelope version $P_A f_k(t)$ or the transform magnitude substituted version of $P_M f_k(t)$ reduces as $k \to \infty$ [V. Velasco, "Some Engineering Applications of the Theory of Non-expansive Operators," PhD Dissertation, Polytechnic Institute of NYU, Farmingdale, N.Y., January 1986].

More interestingly, the iteration that combines both the Fourier transform substitution operation as well as the constant envelope substitution operation has the desired error reduction properties. Thus with $$f_{k+1}(t)=P_A P_M f_k(t)=P_A g_k(t) \quad (11)$$

where we define $$g_k(t)=P_M f_k(t), \quad (12)$$

in that case the error reduction property $$d_{k+1}=\|f_{k-1}-g_{k+1}\|=\|f_{k+1}-P_M f_{k+1}\|\leq\|f_k-P_M f_k\|=\|f_k-g_k\|=d_k \quad (13)$$

is maintained since $$d_{k+1}=\|f_{k+1}-P_M f_{k+1}\|\leq\|f_{k+1}-P_M f_k\|=\|P_A P_M f_k-P_M f_k\|\leq\|f_k-P_M f_k\|=d_k. \quad (14)$$

In equations (11)-(12), observe that $f_k(t)$ represents a constant envelope transmit signal, such as for a transmit signal in a radar system, whereas $g_k(t)$ preserves the desired Fourier transform magnitude function. Furthermore, the above error reduction property is also maintained if the above iteration includes convex projection operators P such as in the iteration $$f_{k+1}(t)=PP_A P_M f_k(t). \quad (15)$$

Here, for example, P can represent the projection operator that truncates the constant modular signal $P_A P_M f_k(t)$ to the interval (0, T) by substituting it to zero outside that interval. The iterative algorithm in equation (15) also satisfies the error reduction property as in equations (13)-(14). Equations (11)-(15) represent the classic Gerchberg-Saxton algorithm [R. W. Gerchberg, W. Saxton, "A Practical Algorithm for the Determination of Phase from Image and Diffraction Plane Pictures," Optik 35, 237, 1972.].

Observe that the iteration in equation (11) is an excellent way to prescribe a given Fourier transform magnitude of a transmit signal for a radar system while maintaining a constant envelope of the transmit signal in the time domain, and together they result in iterates that "get closer" in the sense of the equation (13). From equation (11), $f_{k+1}(t)$ satisfies the constant modulus property while only approximating the given magnitude transform $M(\omega)$; whereas $g_k(t)=P_M f_{k+1}(t)$ possesses the given magnitude transform while only approximating the constant modulus property. Nevertheless, after a large number of iterations, as equation (13) shows, the difference between these signals gets smaller. Notice that since equations (13)-(14) do not guarantee convergence properties for $f_k(t)$, in general there is no unique solution; the final solution is sensitive to the starting point $f_o(t)$, and a careful selection of the initial solution based on other factors is essential.

In particular, the discrete version of the Gerchberg-Saxton algorithm described above can be summarized as follows:
Let $\{f_i\}_{i=1}^N$ and $\{F_k\}_{k=1}^N$ form an N-point DFT (Discrete Fourier Transform) pair at $$\omega_k = \frac{2\pi k}{N},$$
$$k = 1 \rightarrow N,$$

whose magnitude values $|f_i|=a_i$ and $|F_k|=A_k$ are specified both in the time and frequency domain. Here $a_i=a$ for example will refer to the unimodular case. Perform the N-point DFT of the given sequence and substitute the frequency magnitude sequence to $A_k$, then perform the inverse DFT and substitute the temporal magnitude values to $a_i$ and repeat the procedure. Wikipedia summarizes the above algorithm as follows:

[Gerchberg-SaxtonAlgorithm,Wikipedia,
http://en.wikipedia.org/wiki/Gerchberg%E2%80%93Saxton_algorithm]:

Gerchberg-Saxton Algorithm(Source, Target, Retrieved_Phase)     (16)
  A = IFT(Target)
  while error criterion is not satified
    B = Amplitude(Source) * exp(i*Phase(A))
    C = FT(B)
    D = Amplitude(Target) * exp(i*Phase(C))
    A = IFT(D)
  end while
  Retrieved_Phase = Phase(A)
end Gerchberg-Saxton Algorithm The error reduction property in equation (13) is guaranteed in this case also. Interestingly for the N-point discrete case, the above algorithm implicitly contains the temporal limiting projection operator P described in equation (15) and hence it represents the iteration in (15).

III. Unimodular Sequences with Good Auto/Cross Correlations

In the single channel case, which means a single transmitter and typically a single receiver the problem is to design a sequence for the transmit signals or transmit signal $\{x_i\}_{i=1}^N$ such that $|x_i|=1$ for $i=1\rightarrow N$, and their corresponding output signals from output ports of receivers one receiver for each channel which have input thereto matched filter signals (time reversed versions of transmit signals) approximate an ideal delta function for pulse compression and sidelobe suppression. Since the matched filter receiver outputs (receiver output signals when using matched filter control signals) $\{r_k\}_{k=-(N-1)}^{N-1}$ are the autocorrelations of the input sequence, we have $$r_k = \sum_{i=k+1}^{N} x_i x_{i-k}^* = r_{-k}^*, \quad (17)$$

$$k = 0, \pm 1, \pm(N-1).$$

Hence for pulse compression and side lobe suppression of the output signals at the output ports of the receivers, ideally we must have a delta function at the output, i.e., $$r_o=1, r_k=0, k\geq 1 \quad (18)$$

or in this context, minimization of the total sidelobe error $$\varepsilon = (r_o - 1)^2 + 2\sum_{k=1}^{N-1} |r_k|^2 \quad (19)$$

has been suggested as a suitable criterion. Interestingly, the minimization of the above error is closely related to the minimization of the integrated sidelobe level (ISL)

$$ISL = \sum_{k=1}^{N-1} |r_k|^2 \quad (20)$$

or the maximization of the merit factor (MF)

$$MF = \frac{|r_o|^2}{2ISL} \quad (21)$$

proposed in the literature [M. Schroeder, "Synthesis of Low-Peak-Factor Signals and Binary Sequences with Low Autocorrelation," IEEE Transactions on Information Theory, Val. 16, Issue 1, pps. 85-89, January 1970]. It is easy to relate the error in equation (19) or the ISL in equation (20) to the classic discrete-time Fourier transform of the desired sequence $\{x_i\}$ given by $$X(\omega) = \sum_{i=1}^{N} x_i e^{-ji\omega}. \quad (22)$$

In fact, using equation (17), the corresponding spectrum $S(\omega)$ is given by $$S(\omega) = |X(\omega)|^2 = \sum_{k=-(N-1)}^{N-1} r_k e^{-jk\omega} \quad (23)$$

and hence when the ideal conditions in equation (18) are substituted into equation (23) we obtain the new requirement $$S(\omega) \equiv 1 \quad (24)$$

for all $\omega$ in the frequency domain. Eq. (24) represents the known fact that to achieve excellent pulse compression at the outputs of receivers in a radar system, the input sequence for the transmit signals in the radar system must exhibit a flat spectrum. Since the requirement in equation (24) is impossible to maintain over all frequencies by nontrivial finite sequences, to generate unimodular finite length sequences for the transmit signals that satisfy the equation (24), the optimization problem $$\Delta_o = \min_{|x_i|=1} \|S(\omega) - I\|^2 \quad (25)$$

is more meaningful. Eq. (24)-(25) also involves the difficult task of minimizing the error over all frequencies. However, the more relaxed criterion $$\Delta_1 = \frac{1}{2N} \sum_{n=1}^{2N} \|S(\omega_n) - I\|^2, \quad (26)$$

$$\omega_n = \frac{2\pi n}{2N}$$

obtained by averaging the spectral error at 2N equally spaced discrete points only is more appealing since it is also equal to the total sidelobe error c described in equation (19). In fact using equation (22) and equation (26), by direct expansion $$\Delta_1 = \frac{1}{2N} \sum_{n=1}^{2N} \|S(\omega_n) - I\|^2 \quad (27)$$

$$= \frac{1}{2N} \sum_{n=1}^{2N} \left| \sum_{k=-(N-1)}^{N-1} r_k e^{-jk\omega_n} - 1 \right|^2$$

$$= (r_o - 1)^2 + 2 \sum_{k=1}^{N-1} \|r_k\|^2$$

$$= \varepsilon$$

so that minimizing the total sidelobe error, of the output signal or signals at the output port or ports of the receiver or receivers, in equation (19) is equivalent to minimizing the relaxed spectral error $\Delta_1$ in equation (26). But using equation (23), we also have $$\Delta_1 = \frac{1}{2N} \sum_{n=1}^{2N} (|X(\omega_n)|^2 - 1)^2 \quad (28)$$

and clearly equation (28) is minimized by letting $$X(\omega_n) = e^{j\psi_n}, n=1 \to 2N, \quad (29)$$

where $\psi_n$ are arbitrary real constants. Observe that $X(\omega_n)$ represent the DFT coefficient at frequencies $\omega_n = 2\pi n/2N$ and constraint in equation (29) is implementation of the magnitude substitution requirement in the frequency domain as in equation (16). Using the 2N×2N DFT matrix D whose (i, j)$^{th}$ element is given by $$D_{i,k} = \frac{1}{\sqrt{2N}} e^{j2\pi ik/2N} \quad (30)$$

we can rewrite the 2N equations in (29) compactly as $$D^* \underline{X} = [e^{j\psi_1}, e^{j\psi_2}, \ldots e^{j\psi_{2N}}]^T \square \underline{V}, \text{ or } \underline{X} = D\underline{V} \quad (31)$$

where the 2N×1 vector $\underline{X}$ $$\underline{X} = [x_1, x_2, \ldots x_N, 0 \ldots 0]^T, |x_i|=1 \quad (32)$$

represents the extended data vector with $x_i$, i=1→N representing the unimodular entries. Equations (31)-(32) suggest that for the above minimization problem, the 2N-point DFT of the constant modulus data vector $\underline{X}$ in Eq. (32) in the temporal domain should generate another constant modulus vector $\underline{V}$ in the frequency domain and the CAN/WeCAN algorithms perform these operations by employing the magnitude substitution operation both in the frequency domain and the time domain sequentially till the desired accuracy is achieved. But this is the same as a Gerchberg-Saxton algorithm described in equations (11)-(16). Notice that the CAN algorithm in (31)-(32) resets the second half of the temporal coefficients to zero in (32) at every stage. This corresponds to the projection operator P associated with the time-limiting operator mentioned in (15).

Multi-Channel Case:

The multichannel (multi-transmit signals, multi receiver, multi frequency) generalization of the CAN approach also uses the Gerchberg-Saxton algorithm in the time domain and generalizes it to the frequency domain. In fact with the N×M matrix $$X \triangleq [x_1, x_2, \ldots x_M] \triangleq \begin{bmatrix} \underline{y}_1^T \\ \underline{y}_2^T \\ \vdots \\ \underline{y}_N^T \end{bmatrix} \quad (33)$$

containing the M temporal sequences $$\underline{x}_i = [x_{i,1}, x_{i,2}, \ldots x_{i,N}]^T, i=1 \to M, |x_{i,j}|=1 \quad (34)$$

that represent M orthonormal sequences each with N unimodular samples, where the $n^{th}$ row $$\underline{y}_n^T = [x_1(n), x_2(n), \ldots x_M(n)] \quad (35)$$

corresponds to the various receiver channel outputs at the $n^{th}$ time instant. Under stationary assumptions, cross-correlations of different channel waveforms give rise to the auto/cross-correlation coefficients $$r_{i,j}(k) = \sum_{n=1}^{N-k} x_i(n) x_j^*(n-k). \quad (36)$$

Using Eq. (35), the M×M auto/cross-correlation coefficient matrices generated using Eq. (36) can be compactly expressed also using the M×1 column vector $\underline{y}_n$ as $$R_k = \sum_{n=1}^{N-k} \underline{y}_n \underline{y}_{n-k}^* = (r_{ij}(k)), \quad (37)$$

$$k = 0 \to N-1$$

where $R_k$ represents the M×M array output data vector cross-covariance matrix corresponding to lag k. For orthonormal input sequences for transmit signals in a radar system we must have $$R_o = I, R_k = 0, k \geq 1 \quad (38)$$

as in equation (18). Following equation (20), if we define the total sidelobe error criterion $$\varepsilon = \|R_o - I\|^2 + 2 \sum_{k=1}^{N-1} \|R_k\|^2, \quad (39)$$

then, as before with $$\underline{Z}(\omega) = \sum_{i=1}^{N} \underline{y}_i e^{-ji\omega} \quad (40)$$

representing the discrete time Fourier transform of the data set, we have the power spectral density matrix $$S(\omega) \triangleq \underline{Z}(\omega) \underline{Z}^*(\omega) = \sum_{k=-(N-1)}^{N-1} R_k e^{-jk\omega} \quad (41)$$

so that once again the desired error criterion in Eq. (38) can be expressed as $S(\omega) - I \equiv 0$. As in equations (25)-(26), the relaxed criterion $$\Delta_1 = \frac{1}{2N} \sum_{k=1}^{2N} \|S(\omega_k) - I\|^2 = \varepsilon, \quad (42)$$

$$\omega_k = \frac{2\pi k}{2N}$$

is more useful in this context since it relates the point power spectral error with the total sidelobe error in Eq. (39). Expanding equations (42) using equation (41) we also obtain $$\varepsilon = \frac{1}{2N} \sum_{k=1}^{2N} (\|\underline{Z}(\omega_k)\|^2 - 1)^2 + M - 1 \quad (43)$$

so that minimization of $\epsilon$ is achieved by setting the DFT vectors $$\underline{Z}(\omega_k) = \underline{\alpha}_k, \|\underline{\alpha}_k\|^2 = 1 \quad (44)$$

in Eq. (43). Notice that $\alpha_k$ in equation (44) are arbitrary vectors except for their magnitude normalization status. Once again, equation (44) can be compactly expressed as $$\begin{bmatrix} \underline{Z}^T(\omega_1) \\ \underline{Z}^T(\omega_2) \\ \vdots \\ \underline{Z}^T(\omega_{2N}) \end{bmatrix} = D \begin{bmatrix} X \\ 0 \end{bmatrix} = \begin{bmatrix} \underline{\alpha}_1^T \\ \underline{\alpha}_2^T \\ \vdots \\ \underline{\alpha}_{2N}^T \end{bmatrix} = V, \quad (45)$$

$$|x_{i,j}| = 1,$$

$$\|\underline{\alpha}_k\|^2 = 1$$

where D is the 2N×2N DFT matrix defined in Eq. (30), and X is defined as in (Eq. (33)) with $|x_{i,j}|=1$. Observe that the normalization of $\alpha_k$ in the frequency domain in equations (44)-(45) is a generalization of the scalar version of the Gerchberg-Saxton algorithm since $$\|\underline{\alpha}_k\|^2 = \sum_{m=1}^{M} |Z_m(\omega_k)|^2 = M(\omega_k) \quad (46)$$

represents the sum of the magnitudes of the various channel components of the DFT coefficients $\underline{Z}(\omega_k)$ as defined in equation (40) corresponding to the discrete frequency $$\omega_k = \frac{2\pi k}{2N}.$$

Following equations (44)-(45), the multichannel version of the CAN algorithm performs the magnitude substitution operation sequentially both in the frequency domain (∥

$\alpha_k|^2=1$) and in the time domain ($|x_{i,j}|=1$) as in the Gerchberg-Saxton algorithm in equation (16).

The design of unimodular sequences can be further generalized by considering the form of the control signals to be used to be independent from the actual matched filter sequences (i.e. the time reverse transmit signals). This approach is useful in many applications including radar systems, where the receivers do not have to be unimodular and can be something other than the matched filter sequence (i.e. the time reversed transmit signals). In this context, the problem is to design M input unimodular sequences $x_i$, $i=1 \to M$, $|x_{i,j}|=1$, for the transmit signals, each of length N as in equation (33), and the control signals or impulse responses for their corresponding receivers $$\underline{h}_i = [h_{i,1}, h_{i,2}, \ldots h_{i,K}], i = 1 \to M \tag{47}$$

such that the output signals at the receiver output ports, such as receiver output ports 112 and 132 in FIG. 3, should satisfy the "desired" output sequence properties. Thus with $$z_{i,m}(n) = \sum_{k=1}^{N} x_i(k) h_m(n - k + 1), \tag{48}$$

$$n = 1 \to N + K - 1$$

representing the output signal at the output port of the $m^{th}$ receiver due to the $i^{th}$ sequence transmit signal at time instant n, then ideally, we require $$z_{i,m}(n) = \begin{cases} \delta_{i,m}(n - n_o), & i = m \\ 0, & i \neq m \end{cases} \tag{49}$$

where $n_o$ corresponds to the desired peak term at the output. Notice that in general, the receiver length K is a free parameter left to other design considerations.

One approach in this context is to use a criterion similar to the merit factor (MF) in equation (21). Thus if we define $$\eta_i = \frac{|z_{ii}(n_o)|^2}{\sum_{n \neq n_o} |z_{ii}(n)|^2 + \sum_{j \neq i} \sum_{n=1}^{N+K-1} |z_{ij}(n)|^2}, \tag{50}$$

$$i = 1 \to M$$

to represent the ratio of the receiver output signal peak value power to the total undesired sidelobe power for each receiver output signal, then the receiver control signal design problem is to maximize $\eta_i$, $i=1 \to M$. Observe that the criterion in equation (50) is well known and it is the same as the approach behind the classical matched filter (where the control signals are time reversed versions of the known transmit signals). Eq. (50) can be expressed in matrix form as $$\eta_i = \frac{|\underline{b}_{n_o} \underline{h}_i|^2}{\underline{h}_i^* A_i \underline{h}_i}, \tag{51}$$

$$i = 1 \to M$$

where $$A_i = F_{i,0}^* F_{i,0} + \sum F_j^* F_j > 0 \tag{52}$$

represents a K×K positive-definite matrix, and $F_i$ represents the (N+K−1)×K matrix $$F_i = \begin{pmatrix} x_i(1) & 0 & \ldots & 0 & 0 \\ x_i(2) & x_i(1) & \ddots & \vdots & 0 \\ \vdots & x_i(2) & \ddots & 0 & \vdots \\ x_i(N) & \vdots & \ddots & x_i(1) & 0 \\ 0 & x_i(N) & \ddots & \vdots & x_i(1) \\ 0 & 0 & \ddots & x_i(N-1) & \vdots \\ \vdots & \vdots & \vdots & x_i(N) & x_i(N-1) \\ 0 & 0 & 0 & 0 & x_i(N) \end{pmatrix} \tag{53}$$

generated from the $i^{th}$ input sequence $x_i$. In equation (52), $F_{i,o}$ represents the (N+K−2)×K matrix generated from $F_i$ with its $n_o$ row deleted. Finally in equation (51), $\underline{b}_{n_o}$ represents the row vector correspond to the $n_o$ row of $F_i$. Thus in general $$\underline{b}_{n_o} = [0, \ldots 0, x_i(N), x_i(N-1), \ldots x_i(1), 0, \ldots 0] \tag{54}$$

for $n_o > N$. Note that the number of zeros in equation (54) depends on the value of $n_o$ with respect to M. For example, with $n_o = N$ and K=N, the vector $\underline{b}_{n_o}$ is the same as the flipped version of $x_i$ in Eq. (35). Schwarz inequality applied to equation (51) gives the optimum $i^{th}$ receiver filter to be $$\underline{h}_i = A_i^{-1} \underline{b}_{n_o}^*. \tag{55}$$

Observe that the control signals or impulse responses $h_i$ for the receivers in equation (55) are obtained non-iteratively and the freedom present in terms of the transmit signals to select makes the unimodular constraint trivial to implement in terms of the transmit signal to select. Although the selection of the impulse response or control signal for each receiver depends on all input sequences (i.e. all transmit signals) through the matrix $A_i$ in equation (52), nevertheless they can be determined in an uncoupled manner as in the equation (55). Furthermore, the explicit design for the impulse responses or control signals of the one or more receivers allows freedom in deciding the output instant $n_o$ at which the peak, of the output signals at the output ports of the receiver or receivers should be observed. This freedom allows the various peak outputs to be time aligned, a desired property in some radar applications.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:
1. An apparatus comprising
   a first transmitter having a computer processor and a first transmission output;
   a second transmitter having a computer processor and a second transmission output;
   a first receiver having an input port, an output port, a control input, and a computer processor;
   a second receiver having an input port, an output port, a control input, and a computer processor;
   a control device having computer memory and a computer processor;

wherein the computer processor of the first transmitter is programmed to cause the first transmitter to transmit a first transmit signal through the airwaves from the first transmission output;

wherein the computer processor of the second transmitter is programmed to cause the second transmitter to transmit a second transmit signal through the airwaves from the second transmission output;

wherein the first transmit signal has a finite duration waveform and constant modulus in the time domain;

wherein the second transmit signal has a finite duration waveform and constant modulus in the time domain;

wherein the first transmit signal differs from the second transmit signal;

wherein the first transmission output is spaced apart from the second transmission output;

wherein characteristics of the first transmit signal and the second transmit signal are stored in computer memory of the control device;

wherein the computer processor of the control device is programmed to use both the characteristics of the first transmit signal and the second transmit signal to determine a first control signal;

wherein the computer processor of the control device is programmed to use both the characteristics of the first transmit signal and the second transmit signal to determine a second control signal;

wherein the computer processor of the control device is programmed to cause the first and second control signals to be supplied to the first receiver and the second receiver, respectively;

wherein the computer processor of the first receiver uses the first control signal to define an impulse response of the first receiver and to cause a first return signal received at an input port of the first receiver to be filtered and thereby modified into a first output signal at an output port of the first receiver;

wherein the first return signal has a component due to the first transmit signal transmitted through the airwaves and a component due to the second transmit signal transmitted through the airwaves, and the first receiver uses the first control signal to filter the first return signal into the first output signal, so that the first output signal contains a substantial part of the component due to the first transmit signal transmitted through the airwaves, and does not contain a substantial part of the component due to the second transmit signal transmitted through the airwaves;

wherein the computer processor of the second receiver uses the second control signal to define an impulse response of the second receiver and to cause a second return signal received at an input port of the second receiver to be filtered and thereby modified into a second output signal at an output port of the second receiver; and wherein the second return signal has a component due to the first transmit signal transmitted through the airwaves and a component due to the second transmit signal transmitted through the airwaves, and the second receiver uses the second control signal to filter the second return signal into the second output signal, so that the second output signal contains a substantial part of the component due to the second transmit signal transmitted through the airwaves, and does not contain a substantial part of the component due to the first transmit signal transmitted through the airwaves.

2. The apparatus of claim 1
wherein the first and second control signals programmed by the computer processor of the control device are determined as follows the first control signal, which is $h_1(n)$, n=1, 2, ... N and the second control signal, which is $h_2(n)$, n=1, 2, ... N are defined by the equation:

$$\underline{h}_i = [h_i(1), h_i(2), \ldots h_i(K)], i=1 \to 2$$

and $$\underline{h}_i = A_i^{-1} \underline{b}^*_{n_o}, i=1, 2$$

wherein n represents the time-index sampled at a constant sampling rate $A_i^{-1}$ is the inverse of the matrix $A_i$ defined by:

$$A_i = F^*_{i,0} F_{i,0} + \Sigma F^*_j F_j > 0$$

wherein $A_i$ represents a K×K positive-definite matrix, and $F_i$ represents the (N+K−1)×K matrix $$F_i = \begin{pmatrix} x_i(1) & 0 & \cdots & 0 & 0 \\ x_i(2) & x_i(1) & \ddots & \vdots & 0 \\ \vdots & x_i(2) & \ddots & 0 & \vdots \\ x_i(N) & \vdots & \ddots & x_i(1) & 0 \\ 0 & x_i(N) & \ddots & \vdots & x_i(1) \\ 0 & 0 & \ddots & x_i(N-1) & \vdots \\ \vdots & \vdots & \vdots & x_i(N) & x_i(N-1) \\ 0 & 0 & 0 & 0 & x_i(N) \end{pmatrix}$$

generated from the $i^{th}$ input sequence, for the ith transmit signal from the ith transmitter $x_i$;

wherein $F_{i,0}$ represents the (N+K−2)×K matrix generated from $F_i$ with its $n_o$ row deleted;

Wherein $\underline{b}_{n_o}$ represents the row vector correspond to the $n_o$ row of $F_i$, which is $$\underline{b}_{n_o} = [0, \ldots 0, x_i(N), x_i(N-1), \ldots x_i(1), 0, \ldots 0]$$

for $n_o > N$.

3. A method comprising transmitting a first transmit signal through the airwaves from a first transmission output of a first transmitter;

transmitting a second transmit signal through the airwaves from a second transmission output of a second transmitter;

wherein the first transmit signal has a finite duration waveform and constant modulus in the time domain;

wherein the second transmit signal has a finite duration waveform and constant modulus in the time domain;

wherein the first transmit signal differs from the second transmit signal;

wherein the first transmission output is spaced apart from the second transmission output;

further comprising storing characteristics of the first transmit signal and the second transmit signal in computer memory of a control device;

using a computer processor to use both characteristics of the first transmit signal and of the second transmit signal to determine a first control signal;

using a computer processor to use both characteristics of the first transmit signal and of the second transmit signal to determine a second control signal;

supplying the first and second control signals to a first receiver and a second receiver, respectively;

using the first control signal to define an impulse response of the first receiver and to cause a first return signal received at an input port of the first receiver to be filtered and thereby modified into a first output signal at an output port of the first receiver;

wherein the first return signal has a component due to the first transmit signal transmitted through the airwaves and a component due to the second transmit signal transmitted through the airwaves, and the first receiver uses the first control signal to filter the first return signal into the first output signal, so that the first output signal contains a substantial part of the component due to the first transmit signal transmitted through the airwaves, and does not contain a substantial part of the component due to the second transmit signal transmitted through the airwaves;

using the second control signal to define an impulse response of the second receiver and to cause a second return signal received at an input port of the second receiver to be filtered and thereby modified into a second output signal at an output port of the second receiver; and wherein the second return signal has a component due to the first transmit signal transmitted through the airwaves and a component due to the second transmit signal transmitted through the airwaves, and the second receiver uses the second control signal to filter the second return signal into the second output signal, so that the second output signal contains a substantial part of the component due to the second transmit signal transmitted through the airwaves, and does not contain a substantial part of the component due to the first transmit signal transmitted through the airwaves.

4. The method of claim 3 wherein the first and second control signals are determined as follows the first control signal, which is $h_1(n)$, $n=1, 2, \ldots N$ and the second control signal, which is $h_2(n)$, $n=1, 2, \ldots N$ are defined by the equation:

$$\underline{h}_i = [h_i(1), h_i(2), \ldots h_i(K)], i=1, 2$$

and $$\underline{h}_i = A_i^{-1} \underline{b}^*_{n_o}, i=1, 2$$

wherein n represents the time-index sampled at a constant rate, $A_i^{-1}$ is the inverse of the matrix $A_i$ defined by:

$$A_i = F^*_{i,0} F_{i,0} + \Sigma F^*_j F_j > 0$$

wherein $A_i$ represents a K×K positive-definite matrix, and $F_i$ represents the (N+K−1)×K matrix $$F_i = \begin{pmatrix} x_i(1) & 0 & \ldots & 0 & 0 \\ x_i(2) & x_i(1) & \ddots & \vdots & 0 \\ \vdots & x_i(2) & \ddots & 0 & \vdots \\ x_i(N) & \vdots & \ddots & x_i(1) & 0 \\ 0 & x_i(N) & \ddots & \vdots & x_i(1) \\ 0 & 0 & \ddots & x_i(N-1) & \vdots \\ \vdots & \vdots & \vdots & x_i(N) & x_i(N-1) \\ 0 & 0 & 0 & 0 & x_i(N) \end{pmatrix}$$

generated from the $i^{th}$ input sequence, for the ith transmit signal from the ith transmitter $x_i$;

wherein $F_{i,0}$ represents the (N+K−2)×K matrix generated from $F_i$ with its $n_o$ row deleted;

Wherein $\underline{b}_{n_o}$ represents the row vector correspond to the $n_o$ row of $F_i$, which is $$\underline{b}_{n_o} = [0, \ldots 0, x_i(N), x_i(N-1), \ldots x_i(1), 0, \ldots 0]$$

for $n_o > N$.

* * * * *